United States Patent
Redell et al.

(10) Patent No.: US 7,471,949 B2
(45) Date of Patent: Dec. 30, 2008

(54) PROCESS FOR MIGRATING A MOBILE STATION IDENTITY FROM A MOBILE IDENTIFICATION NUMBER TO AN INTERNATIONAL MOBILE STATION IDENTITY

(75) Inventors: Karen Lee Redell, Naperville, IL (US); Douglas H. Rollender, Bridgewater, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 253 days.

(21) Appl. No.: 11/245,463

(22) Filed: Oct. 6, 2005

(65) Prior Publication Data

US 2007/0082666 A1    Apr. 12, 2007

(51) Int. Cl.
*H04Q 7/20* (2006.01)
*H04M 1/00* (2006.01)

(52) U.S. Cl. ............ 455/432.2; 455/432.1; 455/433; 455/435.1; 455/435.2; 455/552.1

(58) Field of Classification Search ......... 455/432–435, 455/552.1
See application file for complete search history.

(56) References Cited

U.S. PATENT DOCUMENTS

| | | | | |
|---|---|---|---|---|
| 5,699,408 A | * | 12/1997 | Kropp et al. | 455/411 |
| 5,862,481 A | * | 1/1999 | Kulkarni et al. | 455/432.2 |
| 6,081,705 A | * | 6/2000 | Houde et al. | 455/411 |
| 6,493,549 B1 | * | 12/2002 | Axelson et al. | 455/419 |
| 2004/0242215 A1 | | 12/2004 | Chambers | 455/418 |
| 2004/0242232 A1 | | 12/2004 | McCormick et al. | 455/435.1 |

OTHER PUBLICATIONS

International Forum on ANSI-41 Standards Technology International Roaming Guide, Version 4.1, May 2001, p. 8 and 9.*
PCT/US2006/039154 International Search Report (Apr. 18, 2007).
Chambers et al., "Applying Lucent's CDMA Full International Mobile Station Identity (IMSI) Feature for Enhanced Preferred Roaming List (PRL)," *Enhanced Preferred Roaming List (PRL)* (Feb. 2004), http://www.cdg.org/news/events/cdmaseminar/04_PRL/Lucent%20v4.pdf (retrieved on Apr. 4, 2007).
TR45 Joint Experts Meeting (JEM) on *Public 800 Mobile and Personal Communications* International Roaming Issues held Nov. 14, 2005 in Arlington, VA. Dec. 19, 2005. 1-14.

* cited by examiner

*Primary Examiner*—Lester Kincaid
*Assistant Examiner*—Daniel Lai

(57) ABSTRACT

A method is provided for controllably migrating a wireless network from MIN based operation to IMSI based operation. The method comprises implementing changes that affect inter-network operations during a first phase of the migration. Remaining changes, including changes that affect intra-network operations are implemented during a second phase of the migration.

13 Claims, 11 Drawing Sheets

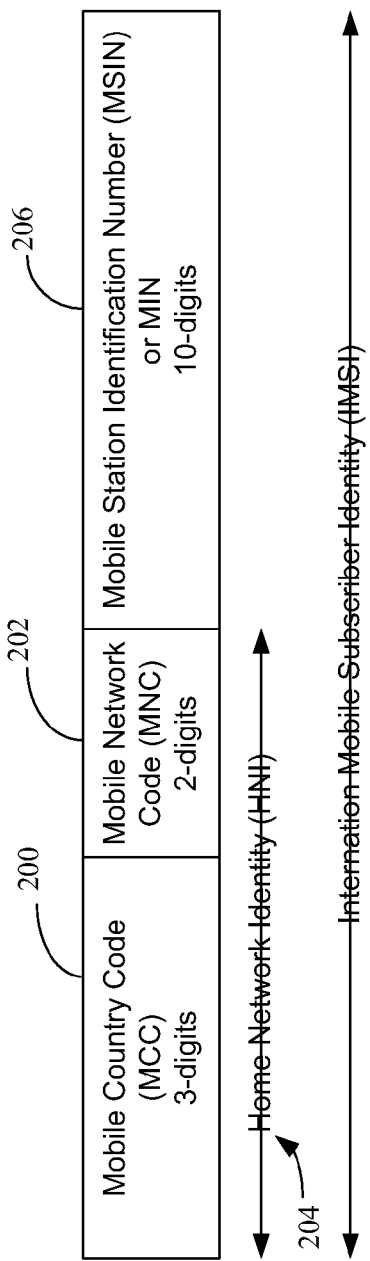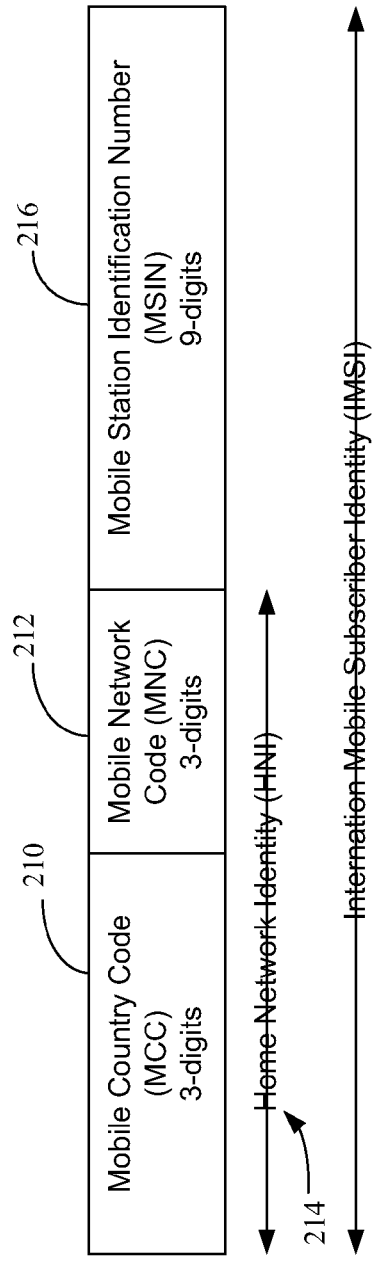

PROCESS FOR MIGRATING A MOBILE STATION IDENTITY FROM A MOBILE IDENTIFICATION NUMBER TO AN INTERNATIONAL MOBILE STATION IDENTITY

BACKGROUND OF THE INVENTION

1. Field of the Invention

This invention relates generally to telecommunications, and, more particularly, to wireless communications.

2. Description of the Related Art

In the field of wireless telecommunications, such as cellular telephony, a system typically includes a plurality of base stations distributed within an area to be serviced by the system. Various users within the area, fixed or mobile, may then access the system, and, thus, other interconnected telecommunications systems, via one or more of the base stations. Typically, a mobile device maintains communications with the system as the mobile device passes through an area by communicating with one and then another base station, as the user moves. The mobile device may communicate with the closest base station, the base station with the strongest signal, the base station with a capacity sufficient to accept communications, etc.

Many mobile devices are programmed by a service provider with a 10-digit, unique subscription identifier called a Mobile Identification Number (MIN). In particular, service providers in the United States utilize MIN, rather than the International Mobile Subscriber Identity (IMSI). The MIN may be used by the service provider to validate, provide customized service, and bill correctly. However, there are several shortcomings associated with the use of MIN. For example, with the explosion of cellular telephony, the number of unique MINs is in danger of being exhausted. Further, there is no international standard for MIN usage, and thus, international roaming standards do not support MIN. For example, a mobile device using MIN cannot roam to a cellular system that employs IMSI.

Migrating away from a fully implemented MIN based system to an IMSI based system is fraught with transitional difficulties. For example, implementation requires coordination of changes to network elements within and beyond a service provider's own network, including the network elements of the service provider's roaming partners and international SS7 transport networks. Further, programming of new and existing mobile devices and back office operational systems must also be implemented. A lack of coordination in any of these changes can create huge difficulties in the wireless system as a whole, potentially shutting down or at least temporarily reducing the capabilities of the wireless system.

SUMMARY OF THE INVENTION

The present invention is directed to overcoming, or at least reducing, the effects of one or more of the problems set forth above.

In one aspect of the instant invention, a method is provided for controllably migrating a network from MIN based operation to IMSI based operation. The method comprises implementing changes that affect inter-network operations during a first phase of the migration; and implementing remaining changes during a second phase of the migration.

BRIEF DESCRIPTION OF THE DRAWINGS

The invention may be understood by reference to the following description taken in conjunction with the accompanying drawings, in which like reference numerals identify like elements, and in which:

FIG. 3 is a stylistic representation of an IMSI numbering scheme that employs at least some aspects of the instant invention and may be used in the communications system of FIG. 1;

FIG. 3A is a stylistic representation of the IMSI numbering scheme used in the United States today.

Figure 1:
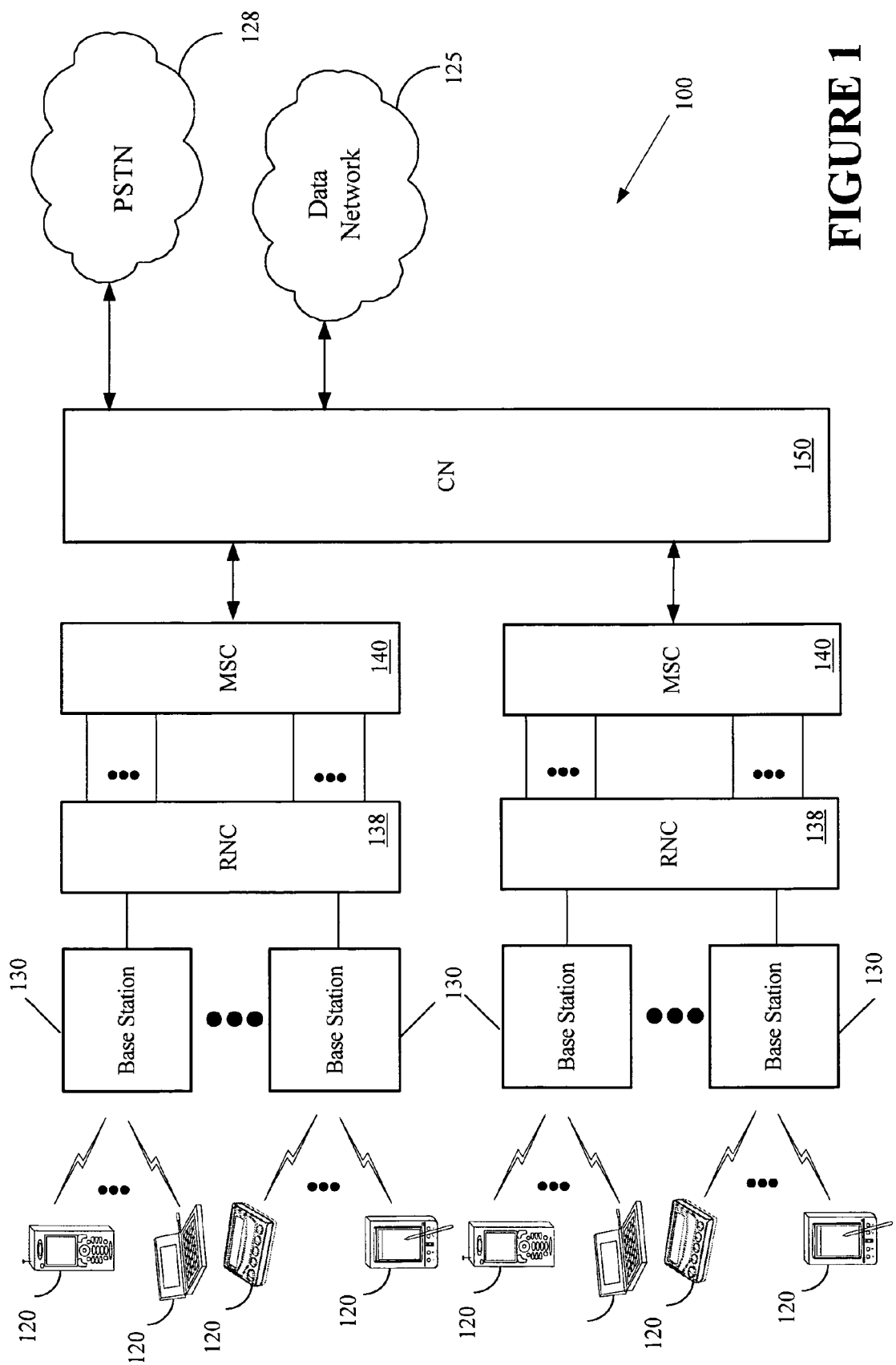
FIG. 1 is a block diagram of a typical communications system in which the instant invention may be employed.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

Turning now to the drawings, and specifically referring to FIG. 1, a communications system 100 is illustrated, in accordance with one embodiment of the present invention. For illustrative purposes, the communications system 100 of FIG. 1 is a Code Division Multiple Access (CDMA) system, although it should be understood that the present invention may be applicable to other systems that support data and/or voice communications. The communications system 100 allows one or more mobile devices 120 to communicate with a data network 125, such as the Internet, and/or a Publicly Switched Telephone Network (PSTN) 128 through one or more base stations 130. The mobile device 120 may take the form of any of a variety of devices, including cellular phones, personal digital assistants (PDAs), laptop computers, digital pagers, wireless cards, and any other device capable of accessing the data network 125 and/or the PSTN 128 through the base station 130.

In one embodiment, a plurality of the base stations 130 may be coupled to a Radio Network Controller (RNC) 138 by one or more connections, such as T1/EI lines or circuits, ATM circuits, cables, optical digital subscriber lines (DSLs), and the like. Those skilled in the art will appreciate that a plurality of RNCs 138 may be utilized to interface with a large number of base stations 130. Generally, the RNC 138 operates to control and coordinate the base stations 130 to which it is connected. The RNC 138 of FIG. 1 generally provides replication, communications, runtime, and system management services. The RNC 138, in the illustrated embodiment handles calling processing functions, such as setting and terminating a call path and is capable of determining a data transmission rate on the forward and/or reverse link for each user 120 and for each sector supported by each of the base stations 130.

Each of the RNCs 138 is coupled to one of a plurality of Mobile Switching Centers (MSCs) 140. The MSCs 140 are generally responsible for providing look-up information regarding call routing for the mobile device 120. Generally, as discussed in greater detail below, the MSC 140 uses the Mobile Station IDentity (MSID) provided by the mobile device 120 to control call routing.

The MSC 140 is also coupled to a Core Network (CN) 150 via a connection, which may take on any of a variety of forms, such as T1/EI lines or circuits, ATM circuits, cables, optical digital subscriber lines (DSLs), and the like. Generally the CN 150 operates as an interface to the data network 125 and/or to the PSTN 128. The CN 150 performs a variety of functions and operations, such as user authentication, however, a detailed description of the structure and operation of the CN 150 is not necessary to an understanding and appreciation of the instant invention. Accordingly, to avoid unnecessarily obfuscating the instant invention, further details of the CN 150 are not presented herein.

The data network 125 may be a packet-switched data network, such as a data network according to the Internet Protocol (IP). One version of IP is described in Request for Comments (RFC) 791, entitled "Internet Protocol," dated September 1981. Other versions of IP, such as IPv6, or other connectionless, packet-switched standards may also be utilized in further embodiments. A version of IPv6 is described in RFC 2460, entitled "Internet Protocol, Version 6 (IPv6) Specification," dated December 1998. The data network 125 may also include other types of packet-based data networks in further embodiments. Examples of such other packet-based data networks include Asynchronous Transfer Mode (ATM), Frame Relay networks, and the like.

As utilized herein, a "data network" may refer to one or more communication networks, channels, links, or paths, and systems or devices (such as routers) used to route data over such networks, channels, links, or paths.

Thus, those skilled in the art will appreciate that the communications system 100 facilitates communications between the mobile devices 120 and the data network 125 and/or the PSTN 128. It should be understood, however, that the configuration of the communications system 100 of FIG. 1 is exemplary in nature, and that fewer or additional components may be employed in other embodiments of the communications system 100 without departing from the spirit and scope of the instant invention.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Figure 2:
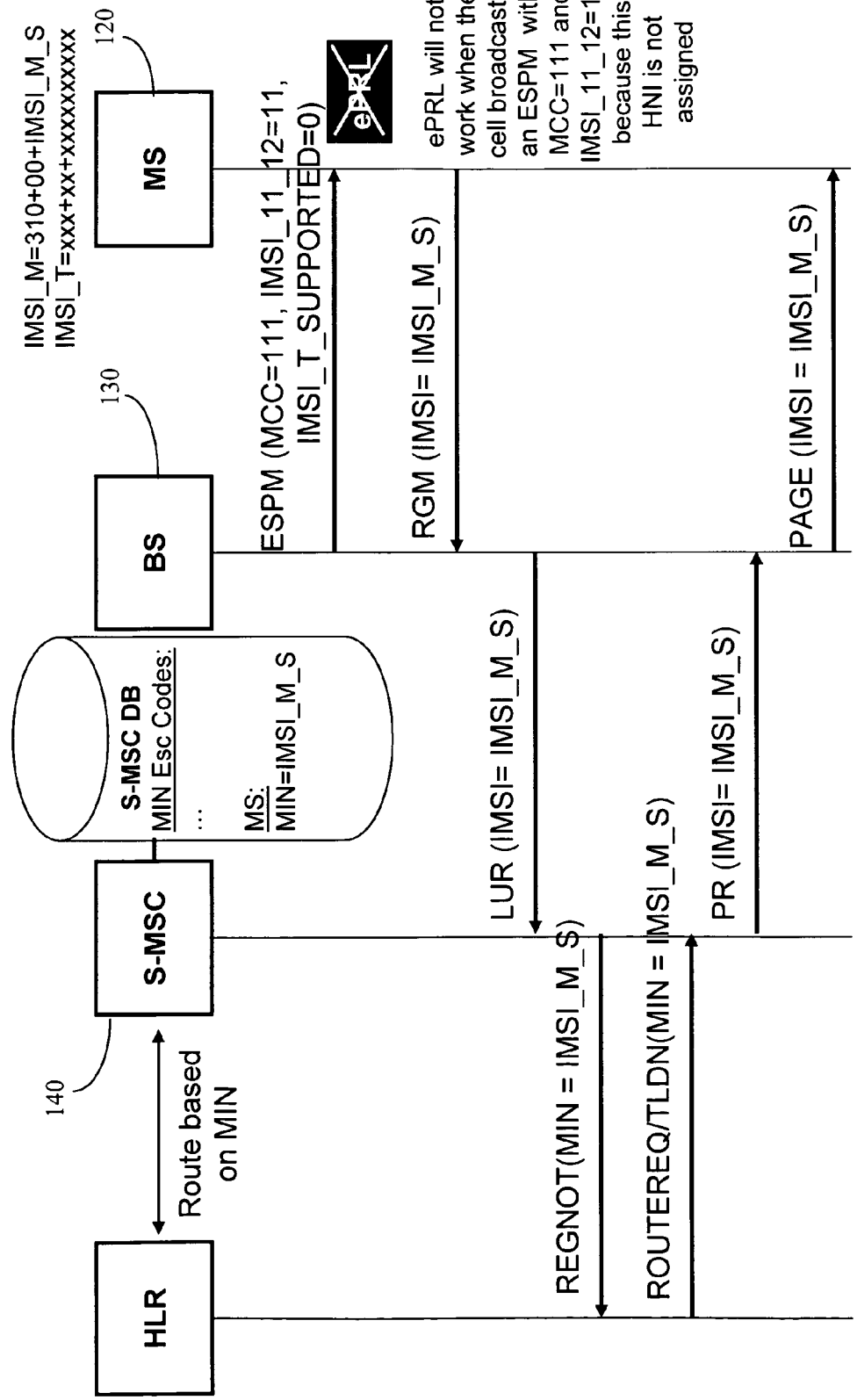
FIG. 2 is a flow diagram stylistically illustrating messages exchanged between the various components of the communications system of FIG. 1 based on a common approach to MIN-based roaming.

Those skilled in the art will appreciate that in the United States, each of the mobile devices 120 has historically used a unique Mobile Station IDentity (MSID) that is comprised of a Mobile Identification Number (MIN). Historically, the MIN is 10-digits long and is assigned and administered by a single organization for service providers in North America, a MIN Block Administrator, and an International Roaming MIN Administrator for service providers outside North America. Under existing standards, each mobile device 120 is allowed to be programmed with two identifiers. One identifier is a 15-digit "true IMSI" and the other is a "MIN-based-IMSI" consisting of a 10-digit MIN preceded by a 5-digit "default" network identifier in the format MCC+00 that is not unique and, therefore, can't be used for routing. This scenario is illustrated in FIG. 2 where the mobile device 120 is programmed with a true IMSI and a MIN-based-IMSI with default digits "310+00" in the leading 5-digits. These leading five digits of any IMSI are called a Home Network Identifier (HNI), as shown on FIG. 3. A unique HNI 204 may be assigned to a service provider. The default HNI digits MCC+00, 310+00 in FIG. 2, may be used by any service provider in a country and therefore are not assigned or unique. FIG. 3A shows the format for a standard IMSI as assigned in the US today with a 6-digit HNI 214. One step in this invention will require a change to US IMSI assignment guidelines to allow assignment of a 5-digit HNI 204 to service providers as shown in FIG. 3. This change provides a 10-digit MSIN space, permitting MSIN 206 to equal MIN.

FIG. 2 illustrates one common approach to MIN-based roaming today. The mobile device 120 identifies itself to the base station 130 with a 10-digit IMSI_M_S (the same as MIN) even though a true IMSI (IMSI_T) may or may not be programmed into the mobile device (MS) 120. The IMSI_T, even if programmed into the mobile device 120, is not sent since the serving MSC 140 does not support true IMSI. This is indicated to mobile device 120 by the IMSI_T_SUPPORTED=0 bit in the Extended System Parameter Message (ESPM) broadcast by the base station 130 to indicate the identity and capabilities of a potential serving MSC 140. For example, in FIG. 2, the ESPM is broadcasting MCC=111 and IMSI_11_12=11 as a default HNI since no 5-digit HNI has been assigned to identify this service provider. Consequently, the mobile device 120 only sends a 10-digit MIN (IMSI_M_S) to the base station 130 in a registration message (RGM(IMSI=IMSI_M_S), and the base station 130 forwards the MIN (IMSI_M_S) to the serving MSC 140 in the location updating request message (LUR(IMSI=IMSI_M_S)). When the ESPM broadcasts an HNI=11111, only the MIN is available to the serving system.

After the mobile device 120 identifies itself to the serving MSC 140, the serving MSC 140 signals a MIN to the home network in the mobile application protocol to identify the subscriber in the HLR using MIN, not IMSI. A registration notification (REGNOT) message is routed through the network from the serving MSC 140 to the HLR using MIN for the network address, rather than IMSI since IMSI is not available. When the supply of new MINs to assign service providers is exhausted due to market growth, a new MSID is needed to replace MIN as both a subscriber identity in the HLR and a routing address to home network elements. The industry has chosen IMSI to replace MIN as the MSID.

Figure 4:
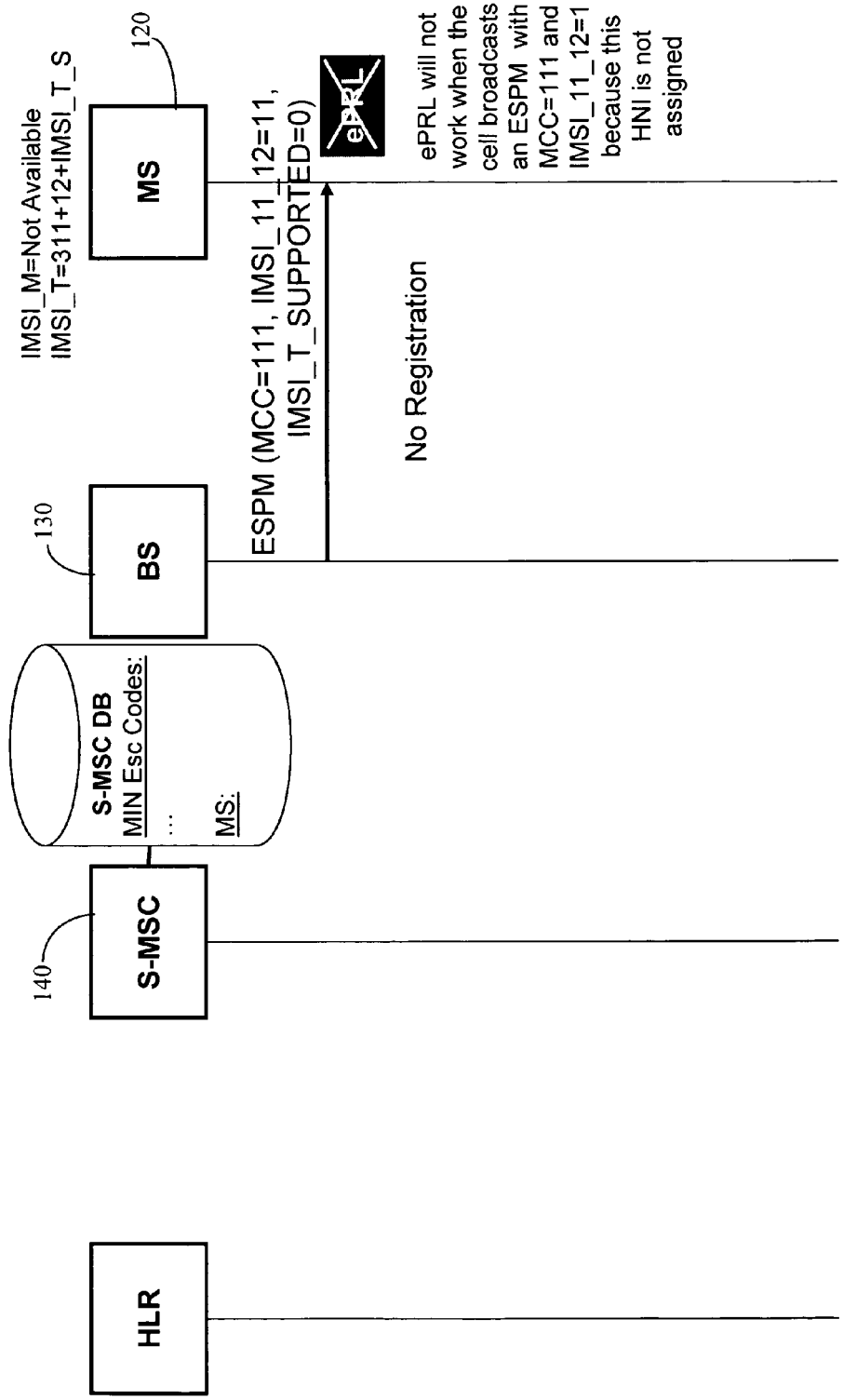
FIGS. 4-10 are flow diagrams stylistically illustrating messages exchanged between the various components of the communications system of FIG. 1 based on at least some aspects of the instant invention in which a variety of mobile devices may seek to communicate with a variety of service providers.

One limited approach to migrate from MIN to IMSI before MIN exhausts is to simply program all phones with a true IMSI and no MIN-based-IMSI. This provides service only in a home system. The problem with this approach is shown in FIG. 4. In this scenario, the ESPM broadcast by the base station 130 does not contain an assigned HNI to identify the potential serving system to the mobile device 120, and true IMSI is not supported. In other words, a true IMSI mobile device 120 has roamed into a system having a MIN-based serving MSC 140. As a result, the mobile device 120 cannot access this system since it does not know the identity of the system and it only has a true IMSI for use to access the system. The system does not support access with true IMSI.

Figure 5:
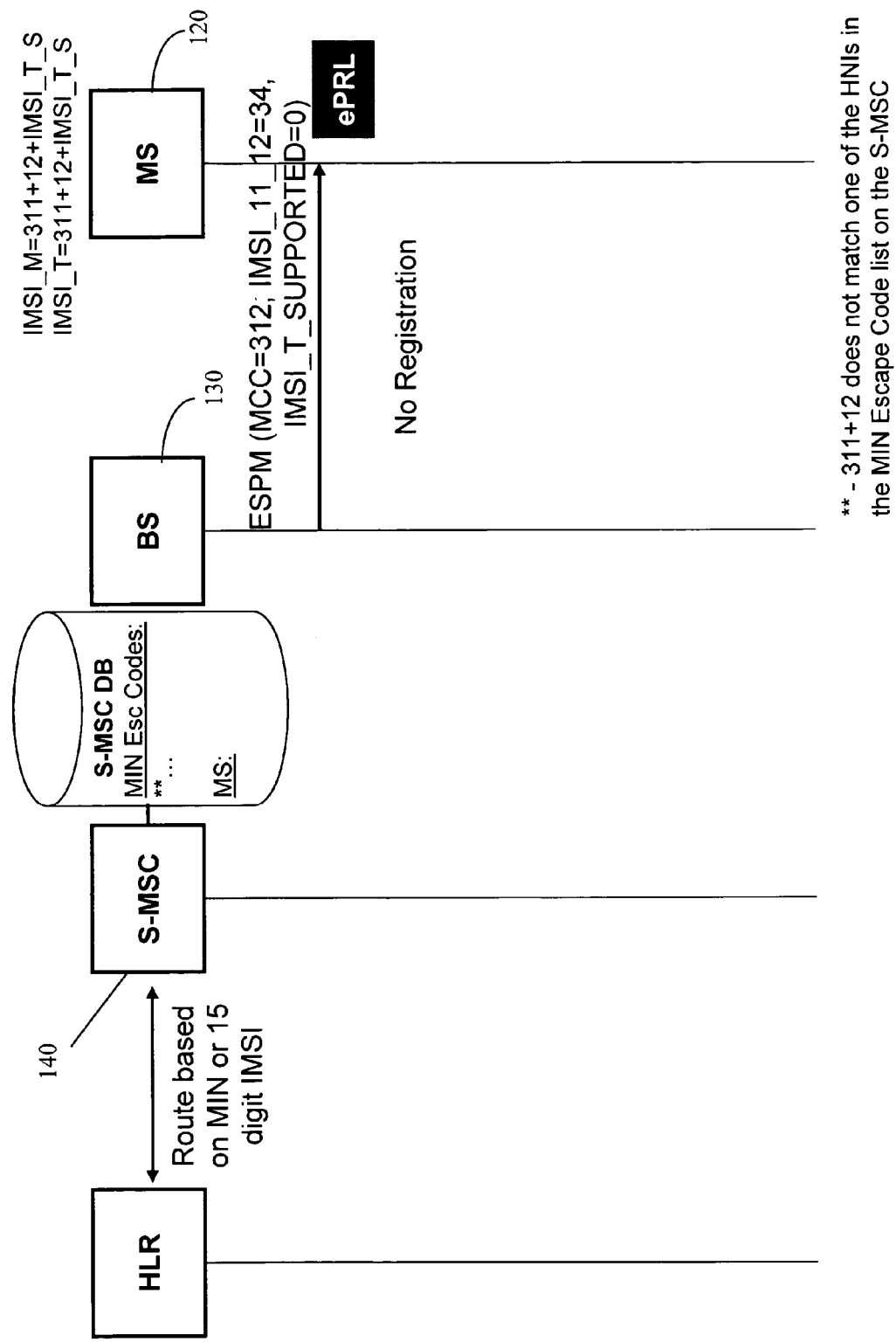

Another potential approach is shown in FIG. 5. In this scenario, there is no MIN-based-IMSI programmed into the mobile device 120, only the true IMSI. Unlike FIG. 4, this potential serving system in FIG. 5 is broadcasting an assigned HNI to identify itself. As true IMSI is still not supported by the potential serving system, the mobile device 120 has no access since it has no IMSI_M_S to identify itself to the base station 130.

In one embodiment of the instant invention, a step-by-step process for migrating individual elements in a network from a dependence upon MIN to IMSI is described in such a way that it will eliminate dependence on MIN assignments as soon as possible (in order to avoid MIN exhaust) and will maintain access to roaming service for subscribers as each element in each service provider's network is transitioned, over time, from MIN to IMSI.

Transitioning from the 10-digit MIN system to the proposed 15-digit IMSI system can be problematic. An approach that doesn't require all the changes to happen at one time perfectly may be desirable. In fact, it may be useful to develop a method to make the necessary changes in a gradual, "change-as-you-go" or one-step-at-a-time process that does not break existing capabilities as changes are made to implement one aspect of the solution at a time. The process involves following steps that allow an evolution through a limited number of scenarios. In other words, some of the numbers may change but the system still works to provide service.

In one embodiment of the instant invention, it is generally desirable to first perform those changes that affect inter-network routing, and then secondly to perform those changes that affect intra-network operations and routing. This gradual change-over method allows each service provider to stop using their assigned MIN after inter-network routing is based on IMSI. This decision is independent of the decision made by a service provider's roaming partners to continue with or stop participation in MIN administration, without breaking roaming, interoperability or message routing between or within networks. In one aspect of the invention, the method allows for a series of incremental steps toward change where each step is generally backward compatible.

In one aspect of the instant invention, a 2-phase process that may be used by a service provider to change from the 10-digit MIN system to the proposed 15-digit IMSI system is described. Within each phase there are multiple steps. The 2-phase process may begin for a service provider who has currently implemented MIN-based roaming or no roaming, such as is shown respectively in FIGS. 2 and 4, where a MIN-based-IMSI either does not exist (FIG. 4) or contains MCC+00 (31000 in FIG. 2) and there are no MIN escape codes. To begin Phase 1 of the process, the service provider acquires an HNI assignment from an IMSI Administrator. The service provider and roaming partners then do the following in any order: 1) optionally add HNI's of service providers that identify subscribers using MIN for home and roaming mobile devices 120 to a MIN Escape Code list in the MSCs 140; 2) add HNI translations for IMSI to STPs in the networks between the service provide and roaming partners; and 3) program all mobile devices 120 with the HNI in the MIN-based IMSI, and, optionally, true IMSI. The service provider and roaming partners then begin to broadcast an ESPM message that contains the assigned HNI and a bit that indicates that true IMSI is not supported, such as the message ESPM (MCC, IMSI_11_12=HNI and IMSI_T_SUPPORTED=0) from each of their base stations.

Alternatively, in some embodiments of the instant invention, it may be useful to program MIN Escape Code lists in the serving MSCs 140 at the beginning of Phase 2, rather than in Phase 1. In one embodiment of the instant invention, the MIN Escape Code list in the serving MSC 140 stores HNIs associated with service providers who identify their subscribers in their home network elements using MIN. When a mobile device 120 sends an IMSI to the serving MSC whose HNI matches an HNI in the MIN Escape Code list, the serving MSC 140 uses the MIN, rather than the IMSI, in the mobile application protocol. The need to provision the MIN Escape Code list is Phase 1 is dependent on the serving MSC's 140 implementation of identifying a MIN-Based IMSI from a mobile device 120. Generally it is not necessary to populate the MSC Escape Code list during Phase 1 because the serving MSC 140 can assume the IMSI provided to it by the mobile device 120 is a MIN-based IMSI because the serving MSC 140 does not support true IMSI. Provisioning the MIN Escape Code List, in either Phase 1 or Phase 2, is needed provide a smooth transition from MIN to IMSI among service provides with differing migration timelines. It allows mobile devices 120 of service providers that are implementing or have completed Phase 1 (the deployment of MIN-Based IMSI) to roam to service provider networks that have finished Phase 2 (the deployment of True IMSI).

In an additional alternative, in some embodiments of the instant invention, it may be useful to program the mobile devices 120 with the true IMSI at the beginning of Phase 2, rather than in Phase 1, to safeguard against roaming partners that have not programmed MIN Escape Code lists properly. This approach is shown in FIG. 5 where a roaming partner has not programmed the home service provider's HNI in the MIN Escape Code list in the serving MSC 140 and service is denied. Generally, it's not necessary to program true IMSI into the mobile devices 120 during Phase 1 because the home network elements, such as the HLR, identify a subscriber based on MIN. However, the HNI is needed within a MIN-Based IMSI to signal a roamer's home network elements.

The service provider and roaming partners may test and verify: 1) ePRL System Acquisition based on MCC and IMSI_11_12; 2) routing based on MIN for the mobile device 120 at home and IMSI for an International Roaming mobile device 120. Generally there is no change to ANSI-41 messaging based on MIN, or billing based on MIN during Phase 1.

At the completion of Phase 1 when all the steps described above are completed for a service provider and the service provider's roaming partners, it is no longer necessary for the MINs, by themselves, to be administered such that they are unique between the service provider and roaming partners. Rather, it is only necessary that each subscriber's MIN be unique within the service provider's network. This is because the unique HNI assigned to the service provider for the MIN-based IMSI will assure a unique IMSI, as between service providers. Accordingly administration of MINs may be performed internally, such as by the service provider. Additionally, the MIN is no longer used or needed for an inter-network signaling address.

Figure 6:
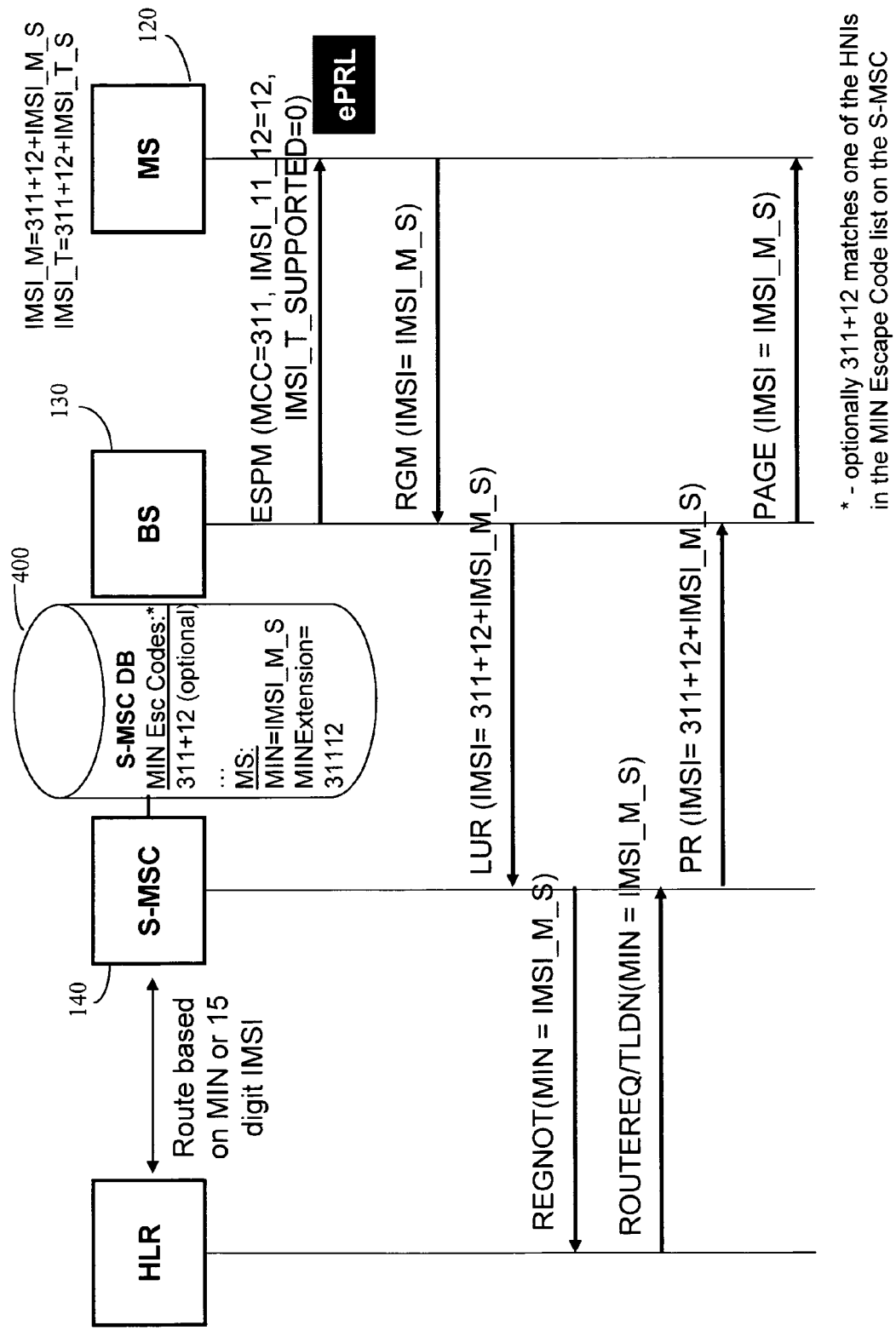

The message flows after completing Phase 1 of the process are illustrated in FIGS. 6 (mobile device 120 at home) and 7A (mobile device 120 roaming). Referring first to FIG. 6, a mobile device (MS) 120 that has true IMSI (optional) and MIN-based-IMSI is attempting to communicate with a base station (BS) 130 of its home service provider, as indicated by its Extended System Parameter Message (ESPM) signaling, which has HNI set to 31112 and is signaling that true IMSI is not supported (IMSI_T_SUPPORTED=0). In this scenario, the mobile device 120 recognizes that it is communicating with its home service provider because the received HNI matches its internally stored HNI, and thus, the mobile device 120 delivers a registration message that contains only the 10-bit MIN portion of its IMSI (RGM (IMSI=IMSI_M_S)). Those skilled in the art will appreciate that under the current standard and without this invention, the mobile device 120 could alternatively, send a less efficient 15-digit response that included a 5-digit HNI value of MCC+00, e.g. 31000 in the US. This would be a default or non-assigned HNI value which would be available for use by all service providers for the country in their subscriber's mobile devices. As such, MCC+00 would not uniquely identify a service provider and could not be used in an ePRL or an ESPM.

Referring still to FIG. 6, the base station 130 prepends its 5-digit HNI (31112 in this example) and forwards a 15-digit location updating request to the serving MSC 140 (LUR (IMSI=311+12+IMSI_M_S)). Optionally, the serving MSC 140 compares the HNI received in the location updating request with the HNIs in the MIN Escape Code list to determine if the IMSI received from the base station 130 is a MIN-based-IMSI. For a MIN-base-IMSI, the serving MSC 140 stores the HNI as a MINExtension for the mobile device 120 in the serving MSC database 400. The serving MSC 140 then forwards a Registration Notification (REGNOT) containing MIN to a Home Location Register (HLR) located within the network or system 100. The Registration Notification message is routed to the HLR through the network using either the MIN or 15-digit IMSI for intra-system signaling.

When a call arrives for the mobile from the network to the serving MSC 140 in the form of ROUTERREQ/TLDN (MIN=IMSI_M_S), the serving MSC 140 forms a 15-digit IMSI paging request by pre-pending the mobile's 5-digit HNI previously stored in the serving MSC database 400 as a MIN-Extension for the mobile device 120 to the MIN (IMSI_M_S), which is forwarded to the base station 130. The base station 130 then issues a page to the mobile device 120 using only the 10-digit IMSI_M_S, again leading to a more efficient use of the air interface than if a 15-digit IMSI were used for the page.

Figure 7A:
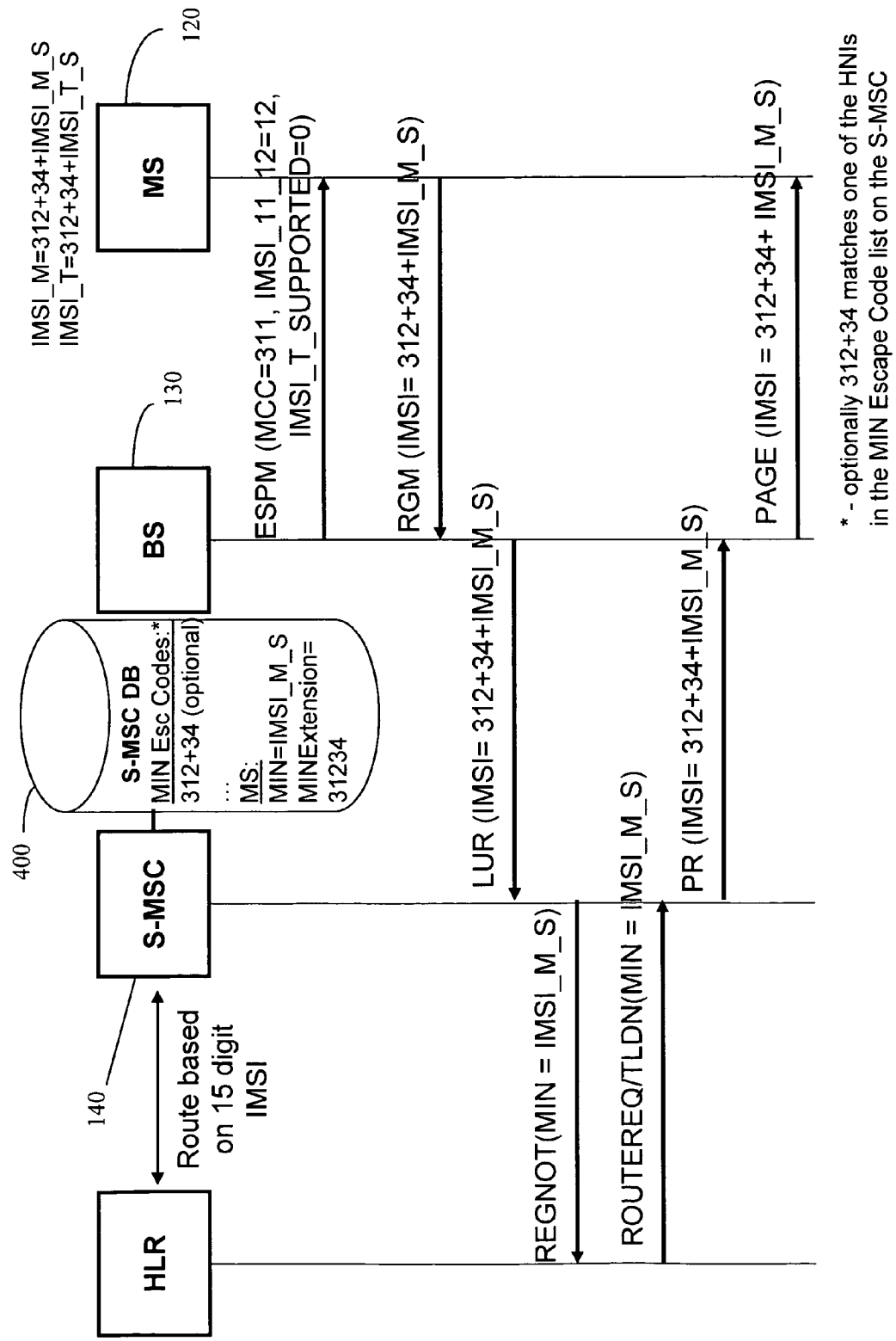

Referring now to FIG. 7A, a roaming mobile device (MS) 120 that has true IMSI (optional) and MIN-based-IMSI set to identical values with an HNI value of 31234 is attempting to communicate with a base station (BS) 130 of a non-home service provider, as indicated by its ESPM signaling, which has HNI set to 31112 (the HNI for the mobile device 120 is set to 31234). The non-home service provider base station 130 is also signaling that true IMSI is not supported (IMSI_T_SUPPORTED=0) by the serving MSC for the mobile application protocol even though the network addressing between the S-MSC and the network may be based on IMSI. The mobile device 120 sends a 15-digit registration message to the base station 130 formed from the MIN-based IMSI (IMSI_M). The base station 130 delivers a 15-digit location updating request based on the same MIN-based-IMSI (LUR (IMSI=312+34+IMSI_M_S)) to the serving MSC 140. Optionally, the serving MSC 140 compares the HNI received in the location updating request from the base station 130 with the HNIs in the MIN Escape Code list. For a MIN-Based IMSI, the serving MSC 140 stores the HNI as a MINExtension for the mobile in the serving MSC database 400. The serving MSC 140 then forwards a registration notification to a Home Location Register (HLR) located within the network or system 100. The Registration Notification message is routed to the HLR through the network using a 15-digit IMSI for inter-system signaling.

When a call for the mobile arrives from the network to the serving MSC 140 in the form of ROUTERREQ/TLDN (MIN=IMSI_M_S), the serving MSC 140 forms a 15-digit IMSI paging request (PR) by pre-pending the mobile's 5-digit HNI previously stored in the serving MSC database 400 as a MINExtension for the mobile device 120 (31234) to the MIN, which is forwarded to the base station 130. The base station 130 then issues a page to the mobile device 120 using only the 15-digit IMSI_M.

Figure 7B:
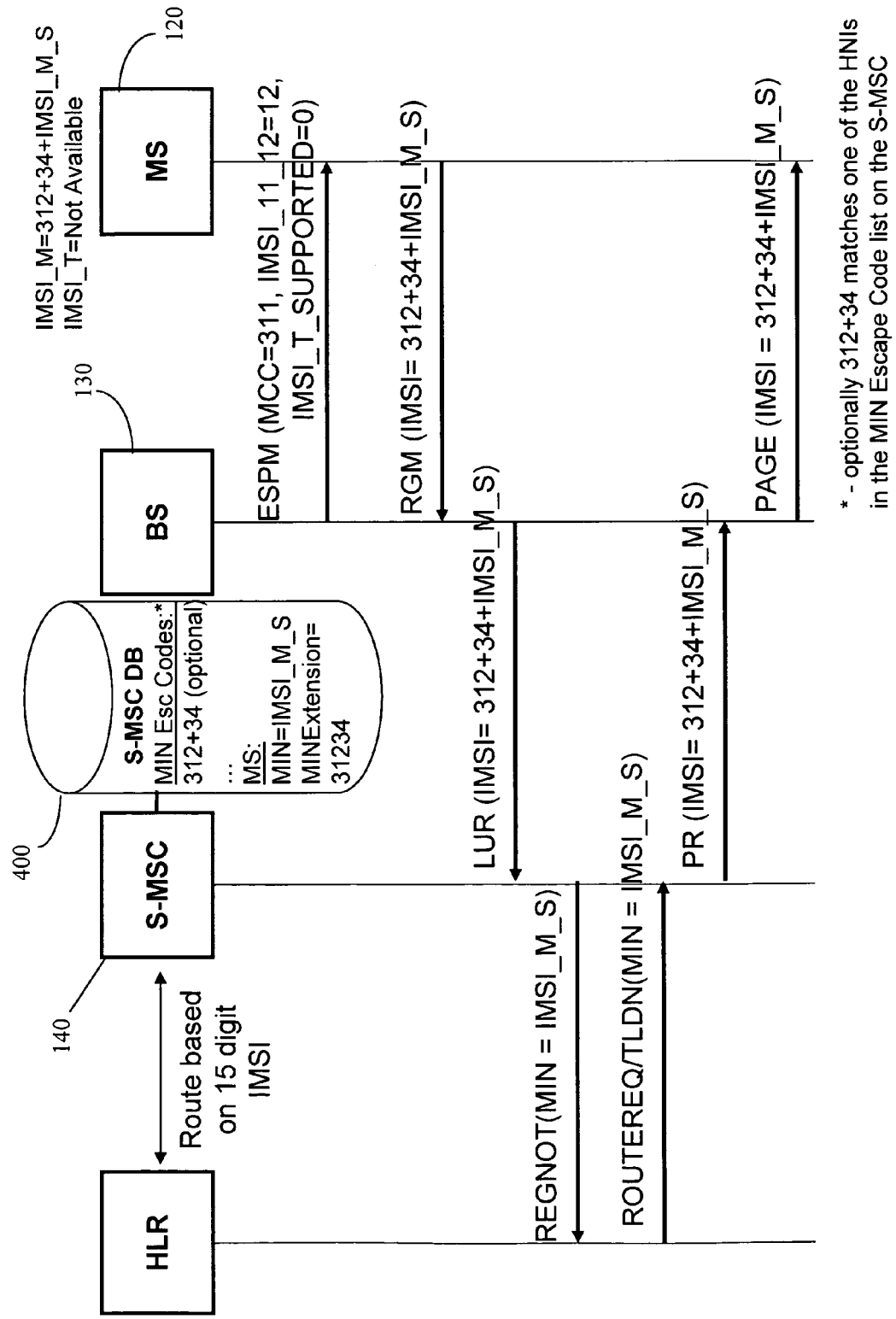

FIG. 7B illustrates message flows in Phase 1 of the process assuming the alternative approach in which the mobile devices 120 is not programmed with the true IMSI until the beginning of Phase 2. This message flow is the same as FIG. 7A since true IMSI is not supported, whether it is available or not. The following is provided for clarification. Referring now to FIG. 7B, a roaming mobile device (MS) 120 that has MIN-based-IMSI only with an HNI value of 31234 (IMSI_T is not provisioned) is attempting to communicate with a base station (BS) 130 of a non-home service provider, as indicated by its ESPM signaling, which has HNI set to 31112 (the HNI for the mobile device 120 is set to 31234). The non-home service provider base station 130 is also signaling that true IMSI is not supported (IMSI_T_SUPPORTED=0) by the serving MSC 140 for the mobile application protocol even though the network addressing between the serving MSC 140 and the network may be based on IMSI. The mobile device 120 sends a 15-digit registration message to the base station 130 formed from the MIN-based-IMSI (IMSI_M). The base station 130 delivers a 15-digit location updating request based on the same MIN-based-IMSI (LUR(IMSI=312+34+IMSI_M_S)) to the serving MSC 140. Optionally, the serving MSC 140 compares the HNI received in the location updating request from the base station 130 with the HNIs in the MIN Escape Code list. For a MIN-based-IMSI, the serving MSC 140 stores the HNI as a MINExtension for the mobile device 120 in the serving MSC database 400. The serving MSC 140 then forwards a registration notification to a Home Location Register (HLR) located within the network or system 100. The Registration Notification message is routed to the HLR through the network using a 15-digit IMSI for inter-system signaling.

When a call for the mobile arrives from the network to the serving MSC 140 in the form of ROUTERREQ/TLDN (MIN=IMSI_M_S), the serving MSC 140 forms a 15-digit IMSI paging request by pre-pending the mobile's 5-digit HNI previously stored in the serving MSC database 400 as a MIN-Extension for the mobile (31234) to the MIN, which is forwarded to the base station 130. The base station 130 then issues a page to the mobile station 120 using only the 15-digit IMSI_M.

Phase 2 of the 2-phase process begins with a service provider updating the following in any order: 1) HLRs with IMSI=HNI+MIN; 2) SCPs with IMSI=HNI+MIN; 3) Billing System with IMSI=HNI+MIN; 4) all Mobile devices 120 with true IMSI if not done in Phase 1; and 5) the MIN Escape Code lists in serving MSCs 140 to include HNI's of service providers that identify subscribers using MIN for home and roaming mobile devices 120, if not done in Phase 1. The service provider also updates the cells to broadcast a message that true IMSI is supported (IMSI_T_SUPPORTED=1) in ESPM. The service provider removes the HNI's of the mobile devices 120 whose home networks have converted to IMSI (including the service provider's own mobile devices) from the MIN Escape Code list in the MSCs.

The service provider and roaming partners should test and verify the following items: 1) ePRL system acquisition based on MCC and IMSI_11_12; 2) ANSI41 message content (mobile application protocol) based on IMSI; 3) roaming based on IMSI; and 4) billing based on IMSI.

Figure 8:
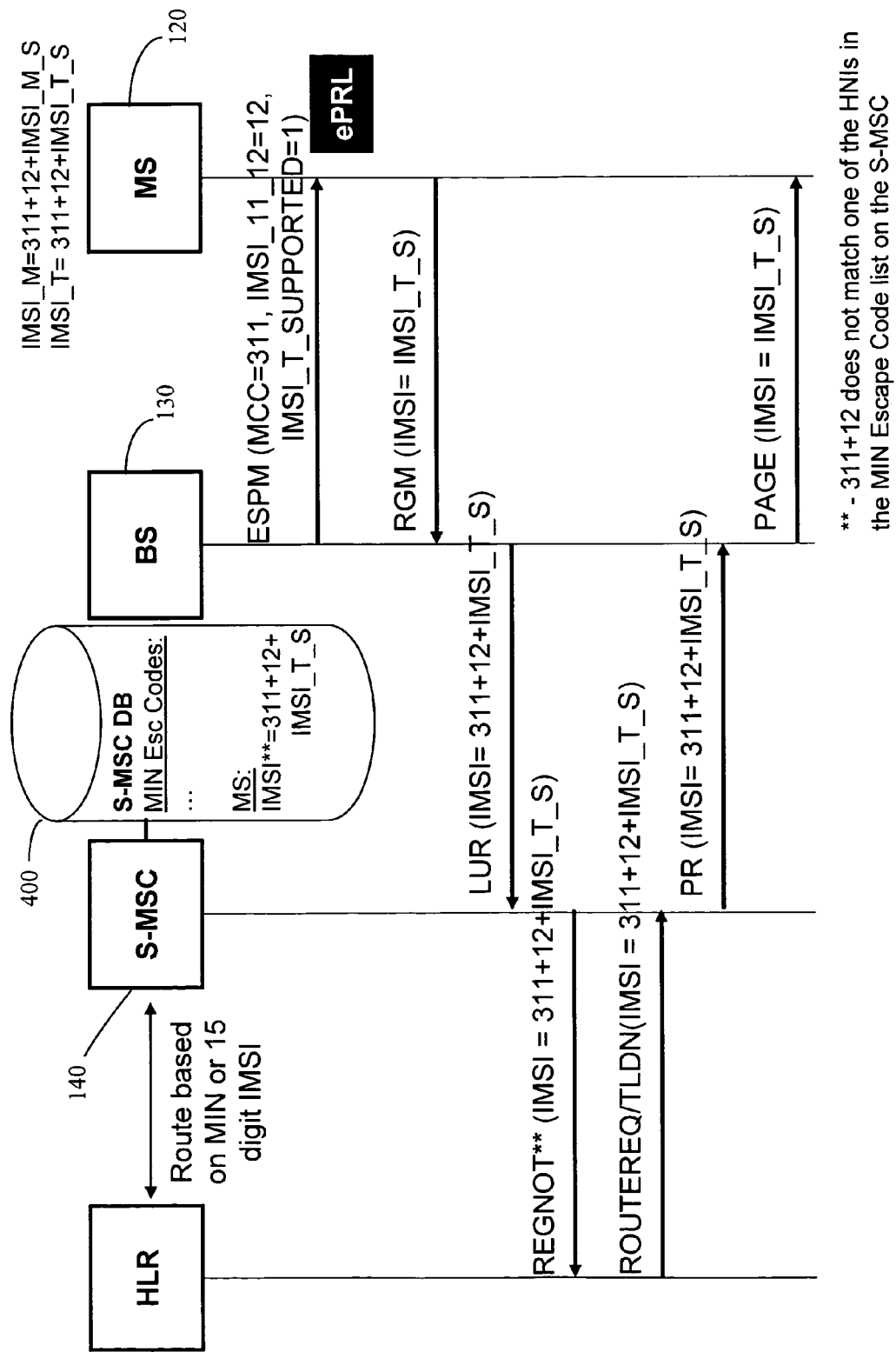

The flow of messages in Phase 2 of the process are illustrated in FIGS. 8 (mobile device 120 at home), 9 (mobile device 120 roaming-IMSI_T not provisioned), and 10 (mobile device 120 roaming). Referring first to FIG. 8, the mobile device (MS) 120 has true IMSI provisioned, which is identical to its MIN-based-IMSI. The mobile device 120 is at home, as indicated by the fact that the HNI in the ESPM is the same as the HNI in the mobile device 120. As a result, the mobile device 120 only needs to send a 10-digit registration message to the base station 130 formed from the MIN portion of the true IMSI (IMSI_T_S). The base station 130 delivers a 15-digit location updating request by pre-pending its HNI onto the same MIN portion of the true IMSI (LUR (IMSI=311+12+IMSI_T_S)). Since the HNI of the home system is not on the MIN Escape Code list, the serving MSC 140 forwards a 15-digit registration notification to a Home Location Register (HLR) located within the network or system 100 (REGNOT(IMSI=311+12+IMSI_T_S)) using either MIN or IMSI as the network address for the HLR.

When a call for the mobile device 120 arrives from the network to the serving MSC 140 in the form of ROUTER-REQ/TLDN(IMSI=311+12+IMSI_T_S), the serving MSC 140 sends a 15-digit Paging Request (PR) to the base station 130 using the IMSI received in the ROUTEREQ. The base station 130 then issues a 10-digit page to the mobile station 120 using only the 10-digit IMSI_T_S.

Figure 9:
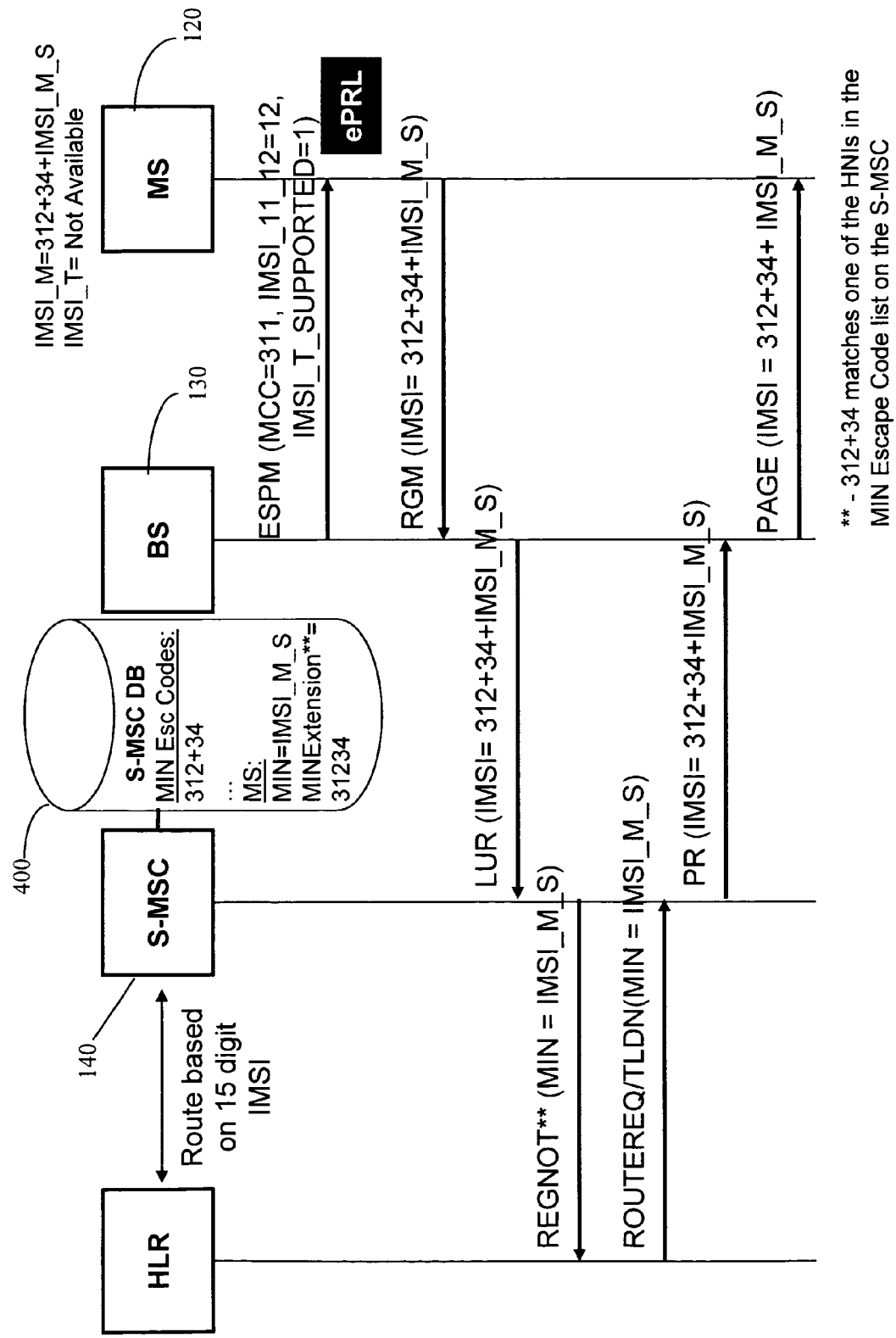

Referring to FIG. 9, a roaming mobile device (MS) 120 that has MIN-based-IMSI only with an HNI value of 31234 (IMSI_T is not provisioned) is attempting to communicate with a base station (BS) 130 of a non-home service provider, as indicated by its ESPM signaling, which has HNI set to 31112 (the HNI for the mobile device 120 is set to 31234). The non-home service provider base station 130 is also signaling that true IMSI is supported (IMSI_T_SUPPORTED=1) in the mobile application protocol by the serving MSC 140 and the network addressing between the serving MSC 140 and the network is based on IMSI. The mobile device 120 sends a 15-digit registration message to the base station 130 formed from the MIN-based-IMSI (IMSI_M), because true (IMSI_T) is not available. The base station 130 delivers a 15-digit location updating request based on the same MIN-based-IMSI (LUR(IMSI=312+34+IMSI_M_S)) to the serving MSC 140. No longer optional, the serving MSC 140 compares the HNI received in the location updating request from the base station 130 with the HNIs in the MIN Escape Code list. If the HNI in the IMSI from the base station 130 matches an HNI in the MIN Escape Code List, the IMSI received from the mobile device 120 is a MIN-based-IMSI, indicating the roamer's home network identifies subscribers using MIN. The serving MSC 140 stores the HNI as a MINExtension for the mobile device 120 in the serving MSC database 400. The serving MSC 140 then forwards a registration notification to a Home Location Register (HLR) located within the network or system 100. The Registration Notification message is routed to the HLR through the network using a 15-digit IMSI for inter-system signaling.

When a call for the mobile device 120 arrives from the network to the serving MSC 140 in the form of ROUTER-REQ/TLDN(MIN=IMSI_M_S), the serving MSC 140 forms a 15-digit IMSI paging request by pre-pending the mobile's 5-digit HNI previously stored in the serving MSC database 400 as a MINExtension for the mobile (31234) to the MIN, which is forwarded to the base station 130. The base station 130 then issues a page to the mobile device 120 using only the 15-digit IMSI_M.

Figure 10:
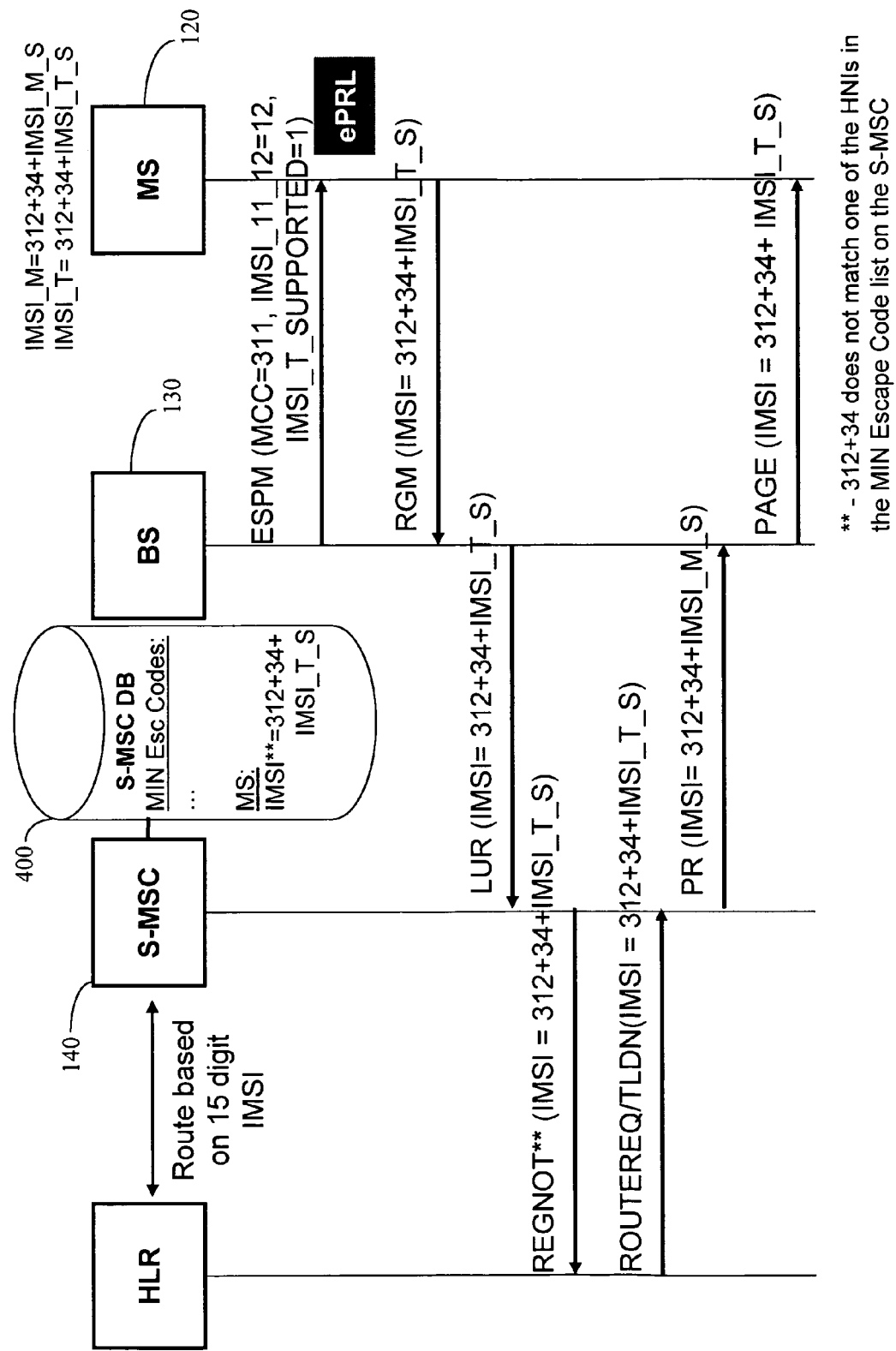

Referring now to FIG. 10, a roaming mobile device (MS) 120 that has true IMSI and MIN-based-IMSI set to identical values is attempting to communicate with the base station (BS) 130 of a non-home service provider, as indicated by its ESPM signaling, which has HNI set to 31112 (the HNI for the mobile device 120 is set to 31234). The non-home service provider base station 130 is also signaling that true IMSI is supported (IMSI_T_SUPPORTED=1) in the mobile application protocol by the serving MSC. The mobile device 120 sends a 15-digit registration message to the base station 130 in the form of a true IMSI, containing an HNI and IMSI_T_S. The base station 130 delivers a 15-digit location updating request based on the same true IMSI (LUR(IMSI=312+34+IMSI_T_S)) to the serving MSC 140. Using a 15-digit IMSI, the serving MSC 140 then forwards a registration notification to a Home Location Register (HLR) located within the network or system 100. The network addressing between the serving MSC 140 and the network is based on IMSI, as MIN is no longer administered to be unique.

When a call for the mobile device 120 arrives from the network to the serving MSC 140 in the form of ROUTER-REQ/TLDN(IMSI=312+34+IMSI_T_S), the serving MSC 140 forms a 15-digit paging request using the IMSI received in the ROUTEREQ. This is forwarded to the base station 130. The base station 130 then issues a page to the mobile station 120 using the 15-digit IMSI formed from the HNI and IMSI_T_S.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EE-PROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by the control units cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Consequently, the method, system and portions thereof and of the described method and system may be implemented in different locations, such as the wireless unit, the base station, a base station controller and/or mobile switching center. Moreover, processing circuitry required to implement and use the described system may be implemented in applicatior specific integrated circuits, software-driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

We claim:

1. A method for controllably modifying operation of at least one call routing entity in a network, the call routing entity initially supporting 10-digit mobile unit identifiers, the method comprising:
   implementing changes that affect inter-network operations during a first phase of a migration, said changes comprising:
      modifying at least one 10-digit mobile unit identifier assigned to at least one mobile unit by appending a cell home network identifier to the 10-digit mobile unit identifier; and
      configuring said at least one call routing entity to determine a unique 15-digit mobile unit identifier from the modified 10-digit mobile unit identifier; and
   implementing remaining changes during a second phase of the migration, wherein implementing remaining changes during a second phase of the migration further comprises updating at least one escape code list to include home network identifiers of service providers that identify subscribers using 10-digit mobile unit identifiers.

2. A method, as set forth in claim 1, wherein implementing changes that affect inter-network operations during a first phase of the migration further comprises broadcasting a message from each cell in the network identifying the cell home network identifier.

3. A method, as set forth in claim 1, wherein implementing changes that affect inter-network operations during a first phase of the migration further comprises broadcasting a message from each cell in the network indicating that true IMSI based on unique 15-digit mobile unit identifiers is not supported.

4. A method, as set forth in claim 1, wherein implementing changes that affect inter-network operations during a first phase of the migration further comprises programming each mobile device associated with the network with a home network identifier that has been assigned to the network.

5. A method, as set forth in claim 4, wherein programming each mobile device associated with the network with the home network identifier that has been assigned to the network further comprises programming each mobile device associated with the network with an international mobile station identity comprised of a mobile identification number and a home network identifier.

6. A method, as set forth in claim 5, wherein programming each mobile device associated with the network with an international mobile station identity comprised of a mobile identification number and a home network identifier further comprises programming each mobile device associated with the network with a 15-digit international mobile station identity comprised of a 10-digit mobile identification number and a 5-digit home network identifier.

7. A method, as set forth in claim 5, wherein programming each mobile device associated with the network with an international mobile station identity comprised of a mobile identification number and a home network identifier further comprises storing the international mobile station identity comprised of a mobile identification number and a home network identifier in locations identified for storing a true international mobile station identity and a Min-based-international mobile station identity.

8. A method, as set forth in claim 1, wherein implementing changes that affect inter-network operations during the first phase of the migration further comprises adding a home network identity of each mobile device to a mobile identification number escape code list.

9. A method, as set forth in claim 1, wherein implementing changes that affect inter-network operations during the first phase of the migration further comprises providing translations from international mobile station identity to home network identity.

10. A method, as set forth in claim 1, wherein implementing remaining changes during the second phase of the migration further comprises implementing changes that affect intra-network operations during the second phase of the migration.

11. A method, as set forth in claim 1, wherein implementing remaining changes during a second phase of the migration further comprises broadcasting a message from each cell in the network indicating that true IMSI is supported.

12. A method, as set forth in claim 1, wherein implementing remaining changes during a second phase of the migration further comprises at least one of:
   replacing, for each mobile unit represented in a home location register, at least one modified 10-digit mobile unit identifier stored in the home location register with a corresponding unique 15-digit mobile unit identifier; and
   replacing said at least one modified 10-digit mobile unit identifier recorded in a billing system with a corresponding unique 15-digit mobile unit identifier.

13. A method, as set forth in claim 1, wherein implementing remaining changes during a second phase of the migration further comprises configuring each mobile unit with a unique 15-digit mobile unit identifier.

* * * * *